United States Patent [19]

Clements

[11] Patent Number: 4,495,307

[45] Date of Patent: Jan. 22, 1985

[54] SHAPED CATALYST PARTICLE FOR USE IN HYDROPROCESSING OF PETROLEUM OILS

[75] Inventor: Porter Clements, Whiting, Ind.

[73] Assignee: Katalco Corporation, Oak Brook, Ill.

[21] Appl. No.: 551,063

[22] Filed: Nov. 14, 1983

[51] Int. Cl.$^3$ .................. B01J 23/24; B01J 23/74; B01J 35/02

[52] U.S. Cl. .................. 502/305; 502/314; 502/325; 502/527

[58] Field of Search .............. 502/314, 527, 305, 325, 502/335

[56] References Cited

U.S. PATENT DOCUMENTS

| | | | |
|---|---|---|---|
| 2,408,164 | 9/1946 | Foster | 502/226 |
| 3,764,565 | 10/1973 | Jacobs et al. | 502/305 |
| 3,990,964 | 11/1976 | Gustafson | 208/254 H |
| 4,076,888 | 2/1978 | Perugini et al. | 502/527 X |
| 4,328,130 | 5/1982 | Kyan | 502/527 X |
| 4,394,303 | 7/1983 | Gibson | 502/527 X |

Primary Examiner—W. J. Shine

[57] ABSTRACT

Petroleum-derived feedstocks are treated at elevated temperatures and pressures in the presence of hydrogen and in contact with a bed of porous catalytic particles. In accordance with the invention, each of the catalytic particles is specially shaped as a cylinder of polylobate cross-section having bluntly rounded, concave, interlobular interstices and in conformity with a selected combination of values of three defining parameters. The particle shape is further characterized as being substantially straight-sided and as having a geometric surface-to-volume ratio in the range of about 40 to about 95 in $^2$/in$^3$. When the catalyst particle cross-section is selected to be circumscribed by a rectangle, the shorter side of the rectangle is about 70% as long as the longer side of the rectangle for all preferred combinations of values of the defining radial parameters. Further, when the entire catalyst particle is circumscribed by a right circular cylinder of the same length as the particle, the particle itself is in contact with the cylinder along three longitudinal elements and occupies about 55% of the volume of the cylinder.

5 Claims, 2 Drawing Figures

4,495,307

SHAPED CATALYST PARTICLE FOR USE IN HYDROPROCESSING OF PETROLEUM OILS

FIELD OF THE INVENTION

This invention relates generally to shaped, porous catalyst particles useful in fixed-bed contacting of petroleum hydrocarbon liquids and gases. More particularly, the invention relates to catalyst particles having a polylobate shape advantageous to the hydrotreating process.

BACKGROUND OF THE INVENTION

A number of catalyst shapes have been described in the prior art. For example, various catalyst particle shapes have been disclosed in: U.S. Pat. No. 2,408,164 to Foster; U.S. Pat. No. 3,966,644 to Gustafson; and U.S. Pat. Nos. 3,674,680 and 3,764,565 to Hoekstra and Jacobs. The aim of these prior art developments has been extending of particle surface-to-volume (S/V) ratios beyond those available in simple cylindrical or spherical forms. Although the S/V ratio in a catalytic reactor may also be increased by reducing the particle size, unacceptably high pressure drops can result from this approach.

BRIEF DESCRIPTION OF THE INVENTION

The present invention overcomes the limitations of prior art particle shapes by providing a cylindric particle with a polylobate cross-section wherein the interlobular interstices are bluntly rounded and generally concave. This advantageous shape increases liquid hold-up in the catalyst bed when the hydrotreating operation is being conducted in the usual downflow manner with the feedstock partly or entirely in the liquid phase. To the extent that the hold-up is increased, the residence time for the hydrotreating reactions is lengthened, improving the productivity and effectiveness of a given volume of catalytic material. Increased effectiveness permits the use of higher hydrotreating feed rates with a consequent lower unit processing cost. Configuring of the particle in accordance with the invention produces a lower pressure drop than is obtained in beds of particles of other shapes known to the art. Utilization of the particle shape of the invention additionally lowers the cost of operating a hydrotreating reactor, whether the system is maintained entirely in the vapor phase, or in the "trickle" flow mode. The catalyst shape of the invention also promotes greater scavenging of undesirable elements such as sulfur and nitrogen than can be accomplished by prior art particle configurations.

Finally the present invention contemplates a physically strong particle capable of withstanding the stresses which are normally encountered during reactor loading and unloading operations and during exposure to typical operating conditions.

Accordingly, a general object of the present invention is to provide a new and improved particle configuration for hydrotreating catalysts and the like.

This and other objects and features of the invention will become apparent from a consideration of the following disclosure.

DETAILED DESCRIPTION OF THE INVENTION

Figure 1:
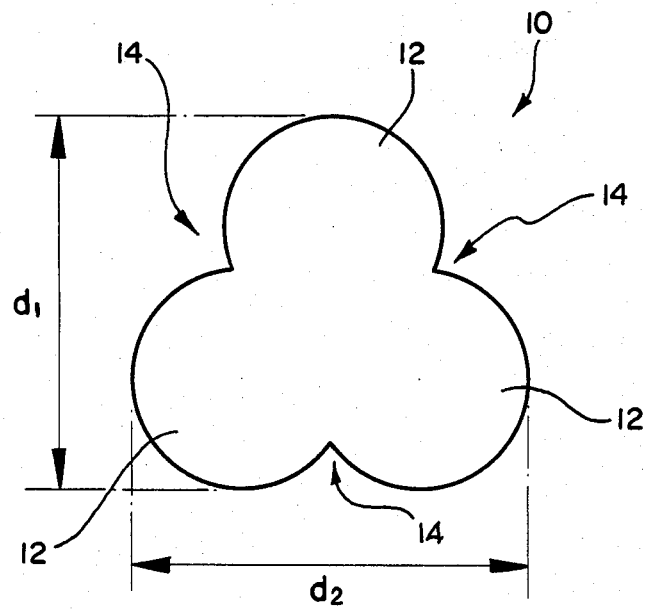
FIG. 1 is a cross-sectional view of a trilobate catalyst particle shaped according to the prior art.

Referring now in detail to the drawing and giving first attention to FIG. 1, a catalyst particle of the prior art is fashioned with a trilobate cross-sectional shape 10 having three individual lobes 12 and indwelling, apical, interlobular interstices 14. A catalyst particle having such a cross-sectional shape is disclosed in U.S. Pat. No. 3,990,964; and further reference to such a particle shape will be made hereinafter in connection with certain of the disclosed working examples.

Figure 2:
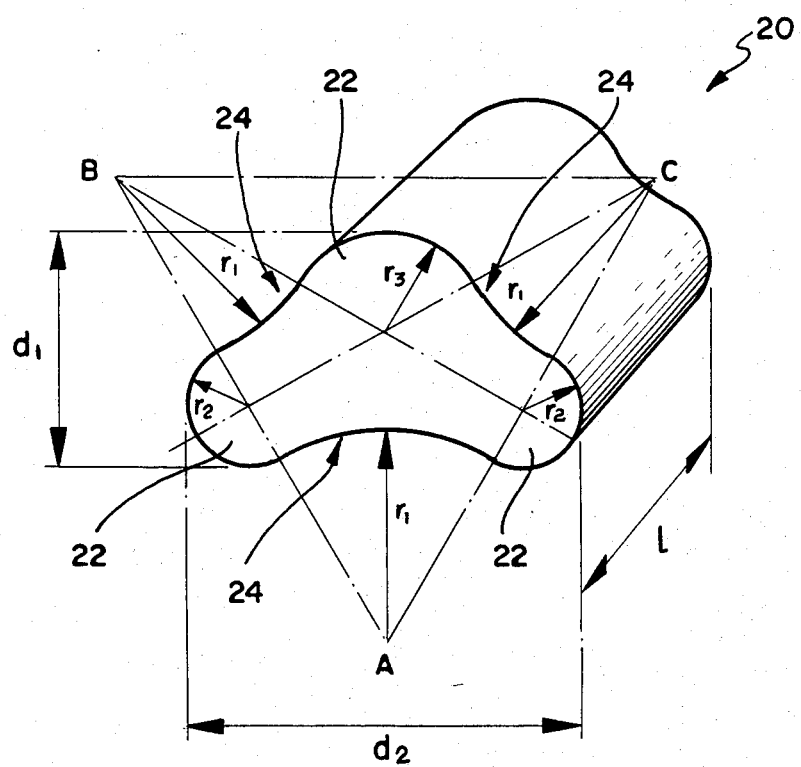
FIG. 2 is a perspective view of a catalyst particle configured in accordance with the present invention.

Turning to FIG. 2 for a description of the present invention, a cylindric catalyst particle 20 will be seen fashioned with a cross-section of polylobate, specifically trilobate, shape wherein the individual lobes 22 are separated by concave interstices 24 which are, advantageously, bluntly rounded with greater curvature than that of the lobes 22.

An equilateral triangle ABC serves as the reference figure for selecting both particle size and the appropriate centers of rotation for the lobe-defining radii $r_2$ and $r_3$ and the interstitial radius of curvature $r_1$. Specifically, midpoints of two adjacent sides AB and AC of the triangle ABC serve as centers for lobe-defining radii $r_2$. The vertices of the equilateral triangle ABC act as the centers for interstitial radii $r_1$; and the common intersection of the bisectors of the angles of the triangle ABC defines the center for the remaining lobe-defining radius $r_3$.

When the trilobular cross-section 20 is circumscribed by an imaginary rectangle, the smaller dimension of the rectangle $d_1$ is selected to equal about 70% of the greater dimension $d_2$. With this proportion determined and with an initial choice made as to the desired overall size of the particle, the radii $r_1$, $r_2$ and $r_3$ are selected to be compatible with the geometric relationships shown. However, radii $r_2$ are preferably not less than about 0.012 inches in order to provide adequate particle strength; and radii $r_1$ are made large enough to produce the long, sweeping arc of curvature that contributes to both the physical strength and the streamlined character exhibited in the shape of the particle of this invention. By also assuring that $r_2 < r_3 < r_1$, no particle can have more than a line contact with any adjacent particle, thus maximizing interparticle (void) space. Preferred combinations of these three radial parameters, in connection with an overall cylindric height (l) of the particle selected to be about 2.5 to 4 times the dimension $d_1$, have evoked particle S/V ratios of about 90 to about 95 $in^2/in^3$ when $d_1$ is from around 0.090 to about 0.110 inches. Modern die manufacturing techniques make the configuration of this invention readily achievable as well as economically feasible for extrusion on a commercial scale.

Catalyst Composition

A useful catalyst composition fashioned in the above-described shape comprises one or more metallic components selected from Group VIB and Group VIII of the Periodic Table of Elements, and a porous, inorganic oxide substrate supporting the metal. Suitable oxide supports include, for example, alumina, silica and silica-alumina. The combined amounts of the metals, calculated as oxides, are selected within the range of about 2 to about 33 weight percent based on total composition. Typically, the Group VIB metal is selected to be molybdenum or tungsten and the Group VIII metal is selected to be cobalt or nickel. The group VIB metals are preferably present in amounts ranging between about 4 to about 28 weight percent calculated as the oxides; and the Group VIII metals are preferably present in amounts ranging between about 2.0 to about 6.0 weight percent calculated as the oxides.

When the support material is selected to be alumina, from 0–10 weight percent silica may be included in the alumina matrix as a stabilizer; and depending on the catalytic application, the pore structure of the support material may be varied so as to obtain a desired average pore size or pore size distribution. The catalyst surface area in the porous structure may be likewise tailored to the intended application by techniques known in the art. Average pore size should be maintained within the range of about 40 to about 600 angstroms in diameter with the surface area between about 100 and about 400 square meters per gram.

Catalyst Preparation

A batch of alumina support was prepared in accordance with procedures well known in the art, extruded through dies containing extrusion orifices of suitable size for producing cylindrical particles according to the prior art and particles of the disclosed polylobate cross-section. These particles were then calcined. This material is hereinafter referred to as "B" and was used in these forms for various tests and in the preparation of cobalt-molybdenum and nickel-molybdenum catalysts. These preparations were made as described in U.S. Pat. No. 3,232,887 granted in the name of G. N. Pessimisis, Feb. 1, 1966, the disclosure of which is incorporated herein by reference. Catalysts thus formulated with a combination of cobalt and molybdenum are designated "C" hereinafter for the prior art shape and "D" for the polylobate shape of the present invention. Similarly, catalyst particles made with a combination of nickel and molybdenum are identified hereinafter as "F" and "H" for a right cylinder shape and as "G" and "I" for the polylobate shape of the present invention. Compositions of the calcined materials are given below in Tables III, IV and V as parts of Examples 3, 4 and 5. Catalyst material designated "E" is a nickel-molybdenum formulation in right cylindrical shape, prepared as above and used as a laboratory reference material.

In order to enhance the understanding of the invention, the following specific examples are given without intending to limit the invention to the specific details set forth.

EXAMPLE 1

To demonstrate the effectiveness and superiority of the configuration of the present invention, when it is desired to keep pressure drop at a minimum in a fixed bed reactor, a sample of a commercial trilobe catalyst, "A", was obtained and pressure drop measurements made under identical test conditions. Flow rates covered a range typical of vapor and gas flows in commercial reactors. The commercial trilobe and the configuration of the present invention were selected to be essentially the same in an overall dimensional sense whereby to restrict the comparison to one in which shape was the dominant feature influencing flow. By the maintaining equality of bed void fractions while at the same time suppressing particle size differences, the greater streamlined character of the bed shaped according to the invention is revealed. Table I shows particle physical measurements and bed pressure drop data.

TABLE I

| | Catalyst | |
|---|---|---|
| | A | D |
| | Commercial | Present |
| Shape | Trilobe | Invention |
| Size* | | |
| $d_1$ (in.) | 0.048 | 0.048 |
| $d_2$ (in.) | .051 | .068 |
| l (in.) | .136 | .176 |
| S/V (in.$^2$/in.$^3$) | 100 | 94 |
| 6 V/S (in.) | .060 | .064 |
| Bed void fraction | .39 | .39 |
| Apparent bulk density (g/ml) | .95 | .70 |

| Percentage | Pressure Drop, in. Hg | | Ratio Trilobe/ |
|---|---|---|---|
| of Flow | A | B | Present Invention |
| 100** | 69.6 | 55.6 | 1.25 |
| 90 | 56.0 | 46.3 | 1.21 |
| 80 | 45.7 | 35.4 | 1.29 |
| 70 | 36.2 | 28.1 | 1.29 |
| 60 | 26.7 | 21.4 | 1.25 |
| 50 | 19.0 | 15.2 | 1.25 |
| 40 | 13.7 | 10.6 | 1.29 |
| 30 | 8.8 | 6.6 | 1.33 |
| 20 | 5.0 | 3.8 | 1.32 |
| | | Average | 1.28 |

*Average of multiple measurements by micrometer with S and V by calculation.
**100% is 1.74 SCFM nitrogen gas flow at one atmosphere pressure and room temperature through a 36" long bed of particles charged with vibration to a glass tube of 1" inside diameter. This flow is equivalent to 6377 gas hourly space velocity. The factor designated as 6 V/S is the diameter of a sphere having the same S/V ratio as the particle.

The manometric measurements of the pressure drop shown in Table I demonstrate the clear-cut advantage of the shape of the present invention over the entire range of flows used. On the average, the trilobe had 28% higher pressure drop, a considerable disadvantage.

EXAMPLE 2

Since catalytic reactors in oil refining practice are commonly used in the downflow mode with concurrent flow of gas and liquid reactants, the amount of liquid present in the bed at any instant is an important factor in the effectiveness and extent of contact between reactants. Let the total liquid hold-up $H_t$ be defined as $H_p + H_e$, where $H_p$ is the quantity of liquid contained in the pores of the catalyst and $H_e$ is the remainder of the bed liquid. In the present discussion $H_p$ may be regarded as without influence in the bed hydrodynamics.

One may divide $H_e$ into components $H_d$ and $H_s$, the dynamic and static hold-up quantities that together are most important in bed hydrodynamic behavior. $H_d$ may be measured by flowing liquid down through a tube containing the bed of particles, then at steady state, simultaneously stopping inflow and outflow, weighing the tube, then allowing the bed to drain and weighing the amount drained. The first value is used in the calculation of $H_t$, the second in obtaining $H_d$, and a separate pore-filling experiment gives $H_p$. Static hold-up is then obtained as $H_s = H_t - H_d - H_p$. Finally, $H_e$ is determined as $H_d + H_s$, with weight values converted to volumes by applying a value for the density of the liquid used. Table II gives results for $H_e$ at three liquid flow rates falling within a range typical of commercial practice. It is seen that the bed of catalyst particles according to the present invention, when compared with an equal volume bed of conventional 1/16" cylindrical extrudate, exhibited hold-up increases of 10%, 16% and 15%.

24% more active when compared on an equal weight basis.

TABLE II

| Support Material Catalyst Shape Solvent Flow Rate* | | B 1/16" Cylinder ml/100 ml bed | | | B Present Invention*** ml/100 ml bed | | | Ratio $H_e$ Present Invention/ $H_e$ Cylinder |
|---|---|---|---|---|---|---|---|---|
| ml/min | LHSV** | $H_d$ | $H_s$ | $H_e$ | $H_d$ | $H_s$ | $H_e$ | |
| 3.5 | 1.6 | 4.7 | 5.6 | 10.3 | 5.6 | 5.7 | 11.3 | 1.10 |
| 9.0 | 4.2 | 6.6 | 5.6 | 12.2 | 8.3 | 5.8 | 14.1 | 1.16 |
| 13.0 | 6.0 | 7.4 | 5.6 | 13.0 | 9.4 | 5.6 | 15.0 | 1.15 |

*300–400° F. boiling range petroleum solvent, 1" inside diameter tube, 12" deep bed
**Liquid hourly space velocity
***Dimensions in Table I; cylinders .063" diameter × .189" long

Catalyst Activity

In comparing the particle shape of the present invention, when used to remove sulfur and nitrogen from a typical petroleum fraction, both low and high pressure test conditions were employed, the low pressure test being concerned only with sulfur removal. A heavy vacuum gas oil was used as the test feedstock having the following properties: 687°–1181° F. boiling range, 19.0 °API gravity, 2.9% sulfur by weight, 1620 wppm total nitrogen and 1.04% by weight Conradson carbon residue.

Evaluation of catalyst activity was based on rates of removal of sulfur and/or total nitrogen as calculated from analyses of feedstock and hydrotreated products using standard analytical and testing procedures. The kinetic behavior of desulfurization in the low pressure test is represented by the relationship by $k = LHSV (S^{-1} - S_o^{-1})$, where k is the desulfurization rate, LHSV is feed liquid hourly space velocity in the hydrotreating test, and S and $S_o$ are weight percent sulfur in product and feed oils, respectively. In a standard test, the conditions were kept the same for all catalysts tested and an increase in the value of k became a direct indication of an increase in activity. It is useful to choose one catalyst and its k value as a reference against which others may be compared, leading to a simple measure of relative activity. In the high pressure test, an appropriate rate expression for sulfur removal is $k = LHSV (S^{-0.5} - S_o^{-0.5})$ and for nitrogen removal, $k = LHSV \ln(N_o/N)$ where S and $S_o$ are as before, $N_o$ and N are feed and product total weight percent nitrogen and ln is the natural logarithm.

EXAMPLE 3

Using the "B" support alumina extruded into cylindrical shape and into the shape of the invention, two cobalt-molybdenum impregnations "C" and "D" were made for activity testing on the heavy vacuum gas oil previously described. Equal volumes of each shape were charged to a dual reactor test unit, nitrogen-purged while heating to 400° F., presulfided with a solution of an organic sulfur compound in a light solvent according to a standard procedure and the unit operated overnight to condition the catalyst. The overnight and subsequent run periods employed hydrogen at a ratio of 2500 std. cu. ft. per bbl. of feedstock, a reactor pressure of 450 psig, a temperature of 650° F. and a feed LHSV of 3.0. Samples of product oil were taken after about 16 hours on stream, stripped free of $H_2S$ using nitrogen gas and analyzed for sulfur content. Table III shows properties of the catalysts and results of the activity test on a relative basis. The shape of the present invention is seen to be 22% more active for sulfur removal when compared on the equal volume basis and

TABLE III

| | CATALYST | |
|---|---|---|
| | C | D |
| Shape | 1/16" Cylinder | Present Invention |
| Weight % | | |
| CoO | 3.34 | 3.38 |
| $MoO_3$ | 14.1 | 14.3 |
| $Na_2O$ | .11 | .18 |
| $Al_2O_3$ | balance | balance |
| PHYSICAL PROPERTIES | | |
| Surface Area ($M^2/g$) | 227 | 217 |
| Apparent Bulk Density (g/ml) | .71 | .70 |
| DIMENSIONS (in) | | |
| d | .063 | — |
| $d_1$ | — | .048 |
| $d_2$ | — | .068 |
| l | .189 | .176 |
| RELATIVE DESULFURIZATION ACTIVITY | | |
| Volume Basis | 1.00 | 1.22 |
| Weight Basis | 1.00 | 1.24 |

EXAMPLE 4

Since nickel-molybdenum catalysts play an important part in hydrotreating hydrocarbon feeds, the support, in the form of cylinders and in that of the present invention, was impregnated with nickel and molybdenum and designated "F" and "G". A laboratory standard nickel-molybdenum catalyst was produced commercially and designated Catalyst "E". A high pressure activity test was then run using the heavy vacuum gas oil feed of Example 3. This run was conducted as in Example 3 except for the following changes: a triple-reactor unit was used, but employing the same reactor geometry as in Example 3; pressure was 1000 psig; temperature 675° F.; and feed LHSV 1.5. Samples of product oils were analyzed for sulfur and activities calculated relative to the Catalyst E standard. The results show that Catalyst F from support "B" cylinders gives essentially the same activity for sulfur removal as the standard Catalyst "E" cylinders, and that shape of the present invention exhibits an activity advantage, equal to a 22% increase over the others. Table IV gives data for the catalysts and activity results.

TABLE IV

| | CATALYST | | |
|---|---|---|---|
| | E | F | G |
| Shape | 1/16" Cylinder | 1/16" Cylinder | Present Invention |
| Weight %: | | | |
| NiO | 5.53 | 5.14 | 5.17 |
| $MoO_3$ | 18.7 | 20.4 | 19.3 |

TABLE IV-continued

|  | CATALYST | | |
| --- | --- | --- | --- |
|  | E | F | G |
| $Na_2O$ | .02 | .08 | .07 |
| $Fe_2O_3$ | .03 | .03 | .03 |
| $Al_2O_3$ | balance | balance | balance |
| PHYSICAL PROPERTIES | | | |
| Surface Area ($M^2/g$) | 170 | 150 | 154 |
| Apparent Bulk Density (g/ml) | .88 | .92 | .88 |
| DIMENSIONS (in.) | | | |
| d | .060 | .062 | — |
| $d_1$ | — | — | .048 |
| $d_2$ | — | — | .068 |
| l | .126 | .162 | .152 |
| RELATIVE DE-SULFURIZATION ACTIVITY | | | |
| Volume Basis | 1.00 | 1.05 | 1.22 |
| Weight Basis | 1.00 | 1.00 | 1.22 |

EXAMPLE 5

Further examination of the activity comparison between the particle shape of the invention and conventional particle geometry was conducted by impregnating support "B" cylinders and the invention particles with nickel and molybdenum to produce catalysts "H" and "I" and running the high pressure test to evaluate both sulfur and nitrogen removal. The procedure and apparatus duplicated that of Example 4 except that only two of the three reactors were used. Table V lists the properties of the catalysts and the relative desulfurization and denitrogenation activities. The shape of the invention is seen again to improve desulfurization by a significant margin with a small increase evident for nitrogen removal.

TABLE V

|  | CATALYST | |
| --- | --- | --- |
|  | H | I |
| Shape | 1/16" Cylinder | Present Invention |
| Weight % | | |
| NiO | 5.20 | 5.38 |
| $MoO_3$ | 18.5 | 17.9 |
| $Na_2O$ | .02 | .02 |
| $Fe_2O_3$ | .03 | .03 |
| $Al_2O_3$ | balance | balance |
| PHYSICAL PROPERTIES | | |
| Surface Area ($M^2/g$) | 160 | 129 |
| Apparent Bulk Density (g/ml) | .87 | .84 |
| DIMENSIONS (in.) | | |
| d | .062 | — |
| $d_1$ | — | .048 |
| $d_2$ | — | .068 |
| l | .149 | .152 |
| RELATIVE DESULFURIZATION ACTIVITY | | |
| Volume Basis | 1.00 | 1.28 |
| Weight Basis | 1.00 | 1.32 |
| RELATIVE DENITROGENATION ACTIVITY | | |
| Volume Basis | 1.00 | 1.02 |
| Weight Basis | 1.00 | 1.05 |

Particle Strength

EXAMPLE 6

The strength of catalyst particles is an important property which governs how well the particles survive repeated reactor loading and discharging operations and whether they are able to withstand the compressive forces exerted on the catalyst bed during use. It is common practice to estimate particle strength with a device in which individual particles are separately crushed between parallel metal plates, one stationary, the other movable and wherein the force is applied to the particle in a side-by-side direction, i.e., across the particle cross-section for an extrudate. The test instrument is designed to register the resistance to crushing in units of force applied up to the moment of particle failure. Information obtained in this way is useful although the forces experienced by individual particles in a packed reactor bed are three-dimensional in nature.

Standard crush tests were run on a number of particles configured according to the commercial trilobe and according to the patent invention, both shapes having been extruded from support "B" alumina. Table VI shows particle dimensions and crush strength values normalized to the customary basis of unit length. In the testing, the particles were side-crushed in a direction perpendicular to the $d_2$ dimension. Both shapes had essentially the same crushing strength as tested, although the particle of the present invention, by virtue of its configuration, was structurally susceptible in this test to crushing at a lower applied force. This susceptibility is obvious when it is noted that the unsupported span between particle bearing points for the particle was 0.042" while for the trilobe, the span was only 0.026", a considerable theoretical advantage in this test. Since the alumina was identical for both shapes it is believed that the trilobe failed as a consequence of its configuration.

TABLE VI

|  | CATALYST | |
| --- | --- | --- |
|  | B | B |
| SHAPE | Trilobe | Present Invention |
| DIMENSIONS (in.) | | |
| $d_1$ | .048 | .048 |
| $d_2$ | .052 | .068 |
| l | .149 | .152 |
| lobe radius | .013 | .013 ($r_2$) |
| Test Support Span* (in.) | .026 | .042 |
| CRUSH STRENGTH | | |
| lb/mm length | 4.6 | 4.4 |
| Standard Deviation (lb.) | 1.4 | 1.4 |

*Horizontal, unsupported distance over which crushing force was applied perpendicularly The invention is claimed as follows:

1. A catalyst particle comprising one or more hydrogenation metals selected from Group VIB and Group VIII of the Periodic Table of Elements and a porous, inorganic oxide substrate supporting said metal or metals, said particle having a generally cylindric configuration with a cross-section of trilobular shape having concave interlobular interstices bluntly rounded with greater curvature than the curvature of the lobes, wherein the trilobular shape is defined by an equilateral triangle, the midpoints of adjacent sides of the triangle serving as the centers for two lobe-defining radii of curvature ($r_2$), the vertices of the triangle defining the centers for the interstitial radii of curvature ($r_1$), and the common intersection of the bisectors of the included angles of the triangle serving as the center for the remaining lobe-defining radius of curvature ($r_3$).

2. A catalyst particle according to claim 1 wherein $r_2 < r_3 < r_1$.

3. A catalyst particle according to claim 4 wherein $r_2$ is at least about 0.012 inches.

4. A catalyst particle according to claim 1 wherein the trilobular cross-section is circumscribed by a rectangle and wherein the cylindric height (L) of the particle is about 2.5 to about 4 times the small dimension ($d_1$) of the rectangle.

5. A catalyst particle according to claim 1 wherein the trilobular cross-section is circumscribed by a rectangle and wherein the smaller dimension ($d_1$) of the rectangle is equal to about 70% of the greater dimension ($d_2$) of the rectangle.

* * * * *